Jan. 2, 1940.    R. H. FAY    2,185,840
COFFEE PERCOLATOR
Filed June 4, 1938
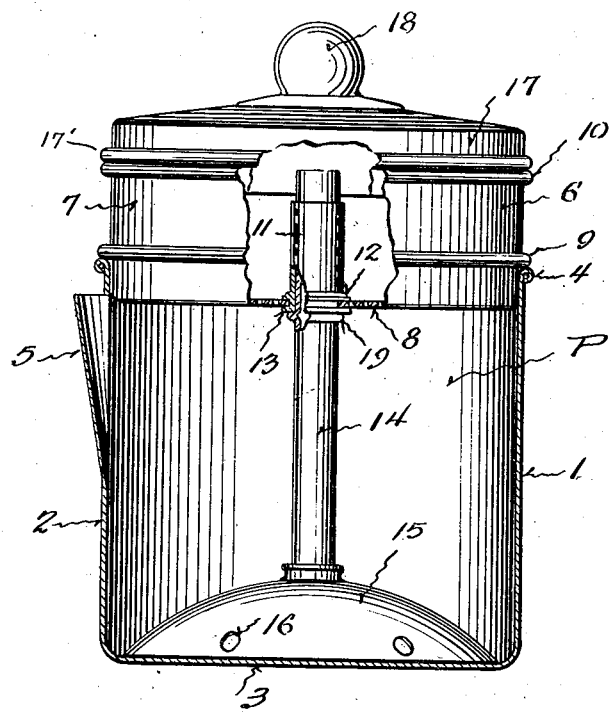
Inventor
RAY H. FAY
By
Attorneys Patented Jan. 2, 1940

2,185,840

UNITED STATES PATENT OFFICE 2,185,840

COFFEE PERCOLATOR

Ray H. Fay, Manitowoc, Wis., assignor to Aluminum Goods Manufacturing Co., Manitowoc, Wis.

Application June 4, 1938, Serial No. 211,743

2 Claims. (Cl. 53—3)

This invention appertains to coffee percolators, and more particularly to percolators of such size and construction as to permit the economical making of a small quantity of coffee (one cup) in a minimum amount of time.

One of the primary objects of my invention is to provide a coffee percolator embodying a cup-shaped body, having detachably fitted in the upper end thereof the container or basket for the ground or pulverized coffee, which, in substance, forms a continuation of the body, the basket directly receiving the cover for the percolator.

Another salient object of my invention is to provide novel means for permitting the free insertion of the basket on the tube of the percolator pump, and at the same time preventing upward movement of the pump relative to the basket, incidental to steam and water pressure acting on the dome-shaped base of the pump during operation of the percolator.

A further important object of my invention is to provide a coffee percolator of the above character embodying a minimum number of parts, which can be easily assembled and taken apart to permit the thorough cleaning of the parts.

With these and other objects in view, the invention consists in the novel construction, arrangement, and formation of parts, as will be hereinafter more specifically described, claimed, and illustrated in the accompanying drawing, in which drawing:

The figure is a side elevation of the improved percolator, with parts thereof broken away and in section to illustrate structural features.

Referring to the drawing in detail, the letter P generally indicates my improved coffee percolator, which comprises a cup-shaped body 1, formed from aluminum, or other suitable material. As illustrated, the body 1 includes a cylindrical side wall 2, and a flat bottom wall 3. The upper edge of the side wall 2 is rolled to provide a peripheral bead 4, which functions to strengthen the body and to eliminate the formation of sharp edges. A pouring spout 5 can be struck directly out of the side wall 2 adjacent to the upper edge of the body. This pouring spout is preferably spaced a slight distance from the rolled bead 4.

The bead 4 forms a seat for the container or basket 6 for the ground or pulverized coffee. This basket or container 6 differs from the ordinary percolator basket, in that the same forms a continuation of the body, and the basket includes an imperforate cylindrical side wall 7, and a perforated bottom wall 8. The side wall 7 has formed therein in spaced relation to the bottom wall 8 an annular bead 9. The basket or container is adapted to be inserted within the top of the body, and the annular bead 9 rests upon the rolled bead 4 of the body. The upper edge of the container or basket can also be provided with a bead 10.

The axial center of the basket or container carries a sleeve 11, and this sleeve has formed thereon adjacent to its lower end an annular shoulder 12, which is adapted to abut the upper surfaces of the bottom wall of the basket. The lower end of the sleeve is upset, as at 13, in intimate contact with the lower face of the bottom wall of the basket. This forms a simple and durable means for connecting the sleeve with the basket. The sleeve is adapted to receive the tube 14 of the percolator pump, and this tube is connected in any desired manner with the dome-shaped hollow base 15 of the pump. Water inlet openings 16 are formed in the hollow base.

A cover 17 of any suitable character is fitted in the upper end of the container or basket, and after the basket is removed from the body, the cover can be placed in said body. An annular bead 17' is formed on the cover above its bottom and engages bead 10, when the cover is in position. The cover 17 detachably carries the glass top 18, whereby persons can observe the functioning of the percolator.

One of the important features of my invention is the provision of means for preventing upward movement of the pump incidental to the forming of pressure in the hollow dome-shaped base 15 during the operation of the percolator.

To prevent upward movement of the pump, the tube 14 has struck out therefrom, or formed thereon, an annular bead 19, which is adapted to engage the lower face of the basket 8, or the outstruck flange 13 on the sleeve 11. Thus, irrespective of the fact that the basket is supported by the body, upward movement of the pump will be eliminated.

In operation of the percolator, the desired quantity of water is placed in the body 1, and the ground or pulverized coffee is placed in the container 7, after which the parts are assembled as shown. Upon the heating of the water, the percolator will function substantially in the ordinary way, and when the made coffee has reached the desired strength, the percolator can be removed from the flame.

Changes in details may be made without departing from the spirit or the scope of my invention, but what I claim as new is:

1. A coffee percolator for use in the making of substantially one cup of coffee, including a relatively short cylindrical body open at its top and having its top edge rolled over to form a bead, said body having a part of its side wall struck-out to form a substantially V-shaped pouring spout, the top of which latter is disposed below the bead but in close proximity thereto, a ground coffee container of less height than that of the body provided with a perforated bottom and having a peripheral bead above its bottom, the lower portion of the container being receivable in the body and having its bead engageable with that of the body, a pump in the body having an upwardly extending tube, a sleeve receivable over the upper end of the tube and having its lower end extending through the container bottom and flanged outwardly to engage the latter on its under face, and further having a peripheral flange which engages the upper face of the container bottom, said tube having a peripheral flange which abuts the outwardly flanged lower end of the sleeve, and a cylindrical closure for the container having a bead spaced above its bottom, the container having a bead at its top engageable with the bead of the closure when the part of the closure beneath its bead is inserted in the container, said body, the container, and the closure being each of substantially the same diameter, whereby the device as a whole is of generally continuous and uninterrupted cylindrical form throughout the entire length of the body of the device, and the overall length of the device being such so that same can be grasped in one hand of the user.

2. A coffee percolator in accordance with claim 1, wherein all of the aforesaid beads and the spout constitute the sole projections throughout the entire height of the device, the latter devoid of other handles or the like.

RAY H. FAY.